United States Patent [19]

Yatka et al.

[11] Patent Number: 5,425,961
[45] Date of Patent: Jun. 20, 1995

[54] CHEWING GUM PRODUCTS USING FRUCTOOLIGOSACCHARIDES

[75] Inventors: Robert J. Yatka, Orland Park; Lindell C. Richey, Lake Zurich; Marc A. Meyers, Naperville, all of Ill.

[73] Assignee: Wm. Wrigley Jr. Company, Chicago, Ill.

[21] Appl. No.: 211,341
[22] PCT Filed: Sep. 30, 1992
[86] PCT No.: PCT/US92/08356
§ 371 Date: Mar. 28, 1994
§ 102(e) Date: Mar. 28, 1994
[87] PCT Pub. No.: WO93/06740
PCT Pub. Date: Apr. 15, 1993
[51] Int. Cl.⁶ ............................................. A23G 3/30
[52] U.S. Cl. .................................... 426/3; 426/548; 426/804; 426/658
[58] Field of Search ............................... 426/3-6, 426/548, 658, 804

[56] References Cited

U.S. PATENT DOCUMENTS

| | | | |
|---|---|---|---|
| 2,782,123 | 2/1957 | Rubin | 426/658 |
| 3,894,146 | 7/1975 | Tsuyama | 424/49 |
| 4,613,377 | 9/1986 | Yamazaki et al. | 127/39 |
| 4,681,771 | 7/1987 | Adachi et al. | 426/658 |
| 4,722,844 | 2/1988 | Ozawa et al. | 426/3 |
| 4,724,136 | 2/1988 | Scheibl | 424/50 |
| 4,728,515 | 3/1988 | Patel et al. | 426/3 |
| 4,871,574 | 10/1989 | Yamazaki et al. | 426/622 |
| 4,902,525 | 2/1990 | Kondou | 426/548 |
| 4,902,674 | 2/1990 | Speights | 514/23 |
| 4,937,092 | 6/1990 | Brotsky et al. | 426/643 |
| 4,957,763 | 9/1990 | Saita et al. | 426/548 |
| 4,978,751 | 12/1990 | Biton et al. | 536/123 |
| 4,987,124 | 1/1991 | Speights et al. | 514/23 |
| 5,013,576 | 5/1991 | Nakazawa et al. | 426/640 |
| 5,032,579 | 7/1991 | Speights et al. | 514/23 |
| 5,095,106 | 3/1992 | Gaffar et al. | 536/123 |
| 5,127,956 | 7/1992 | Hansen et al. | 127/42 |
| 5,169,671 | 12/1992 | Harada et al. | 426/658 |

FOREIGN PATENT DOCUMENTS

| | | |
|---|---|---|
| 0301628A1 | 2/1989 | European Pat. Off. . |
| 0337889A1 | 10/1989 | European Pat. Off. . |
| 0397027A1 | 11/1990 | European Pat. Off. . |
| 0498463A1 | 8/1992 | European Pat. Off. . |
| 0532775A1 | 3/1993 | European Pat. Off. . |
| 59-173066 | 9/1984 | Japan . |
| 1-037255 | 2/1989 | Japan . |
| 4-135460 | 5/1992 | Japan . |
| 4-356169 | 12/1992 | Japan . |

(List continued on next page.)

OTHER PUBLICATIONS

"Polyfructan and Oligofructans Synthesized from Sucrose by Conidia of *Aspergillus sydowi* IAM 2544," by Genshiro Kawai, Hajime Taniguchi and Michinori
(List continued on next page.)

*Primary Examiner*—Jeanette Hunter
*Attorney, Agent, or Firm*—Steven P. Shurtz; Willian Brinks Hofer Gilson & Lione

[57] ABSTRACT

Chewing gum products and other comestibles containing fructooligosaccharides and methods of making such products are disclosed. In one embodiment, the fructooligosaccharides are used in a rolling compound applied to the chewing gum product. In a second embodiment, the fructooligosaccharides are used in a coating, such as a hard-shell coating, for a pellet gum. In a third embodiment, fructooligosaccharides are used in the center fill of a chewing gum. In a fourth embodiment, aspartame is used to sweeten the gum composition and fructooligosaccharides are provided, preferably in an effective amount to stabilize the aspartame such that after eight weeks of storage at 85° F., at least 5% less aspartame decomposes than would have decomposed if the fructooligosaccharides were not included. Fructooligosaccharides are also codried with other sweeteners, coevaporated to make syrups and used as an encapsulating agent for high-intensity sweeteners or flavors used in gum compositions.

34 Claims, 7 Drawing Sheets

FOREIGN PATENT DOCUMENTS

WO91/13076 9/1991 WIPO.
WO92/08368 5/1992 WIPO.
WO92/08371 5/1992 WIPO.
WO93/02566 2/1993 WIPO.
WO93/06740 4/1993 WIPO.
WO93/12666 7/1993 WIPO.

OTHER PUBLICATIONS

Nakamura, from *Agr. Biol. Chem*, 37(9), pp. 2111–2119 (1973).

NutraFlora ™ Fructooligosaccharide Information by ZeaGen, Inc., information package, 21 pages (Mar., 1992).

"Introduction to OLIGO-SUGAR," Cheil Foods & Chemicals Inc., Seoul, Korea, 8 pages, undated.

Fructooligosaccharide Information Package, Coors BioTech, Inc., 18 pages (May, 1990).

"Soluble & Insoluble BULKING AGENTS Prospects & Applications" schedule of events, organized by International Business Communications, 3 pages (Mar., 1991).

"Inulin and Inulo-oligosaccharides: Their Properties and Use as Soluble Bulking Agents" by Dr. George Smits and Dr. Barrie Norman, 10 pages (Mar., 1991).

RAFTILOSE, Oligofructose, Raffinerie Tirlemontoise S.A., Tiense Suikerraffinaderij N.V., 27 pages, undated.

RAFTILINE, Raftiline, Raffinerie Tirlemontoise S.A., Tiense Suikerraffinaderij N.V., 21 pages, undated.

"Fructooligosaccharides (FOS)–an All Natural, Versatile, Low-Calorie Bulking Agent," by Dr. Peter J. Perna, 36 pages, undated.

CHEWING GUM PRODUCTS USING FRUCTOOLIGOSACCHARIDES

CROSS REFERENCE TO RELATED APPLICATION

The present application is a continuation-in-part of application Ser. No. PCT/US 91/07172, filed as a PCT application on Sep. 30, 1991. That application, published as WO 92/08368, is incorporated herein by reference.

BACKGROUND OF THE INVENTION

The present invention relates to improved chewing gum products. More particularly, the invention relates to improving chewing gum by the use of specific bulking agents in sugar and non-sugar chewing gum products to give improved texture, moisture absorption properties, and improved shelf life properties, including aspartame stability. The improved chewing gum compositions may also be used in a variety of chewing gum products, such as confectionery coated chewing gum products.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol, and xylitol. New polyols are being developed using new technology to replace these polyols. New polyols have various unique properties which can improve the taste, texture, and shelf life properties of chewing gum for consumers.

The non-sugar polyols have the advantage of not contributing to dental caries of consumers, as well as being able to be consumed by diabetics. However, all polyols have the disadvantage of causing gastro-intestinal disturbances if consumed in too great of a quantity. Therefore it would be a great advantage to be able to use a carbohydrate or carbohydrate-like food ingredient for chewing gum that would act as a bulking agent, but not contribute to dental caries nor cause gastrointestinal disturbances.

One such bulking agent comprises fructooligosaccharides (FOS). This bulking agent or bulk sweetener is not approved for use in human food products or in chewing gum in the U.S. However, a GRAS affirmation petition for FOS as a human food ingredient is currently being prepared. The bulk sweetener is approved for use in Japan and is being used in a variety of foods. Although a sugar, FOS does not contribute to dental caries, does not cause as significant of gastro-intestinal disturbances as polyols and does not significantly contribute to calories. Thus, this ingredient's use in chewing gum could be a definite improvement.

Unique types of fructose compounds were first disclosed in U.S. Pat. No. 2,782,123. The sweetener is obtained from Jerusalem artichoke tubers which contain inulin, a carbohydrate composed of fructose and glucose. The inulin is treated by acid hydrolysis.

U.S. Pat. No. 3,894,146 discloses a coupling sugar called oligoglycosyl fructose derived from other sugars.

Fructosyl oligomers and oligosaccharides are disclosed in U.S. Pat. No. 4,978,751, EPO Patent Publication No. 0 301 628 and EPO Patent Publication No. 0 337 889.

Branched fructooligosaccharides are disclosed in PCT Publication WO 91/13076.

Fructooligosaccharides (FOS) are disclosed in U.S. Pat. Nos. 4,902,674; 4,987,124; and 5,032,579 as a method and composition for inhibiting the growth of Salmonella. Fructooligosaccharides are also disclosed in EPO Patent Publication No. 0 397 027 and Japanese Patent No. 3,095,102 as a method for killing pests.

U.S. Pat. No. 4,681,771 discloses a low caloric, low cariogenic sweetener comprising fructooligosaccharides having from 1 to 4 molecules of fructose bound to sucrose. The use of the sweetener in chewing gum is described in Example 10. The patent is assigned to the Japanese firm of Meiji Seika Kaisha, who have joined forces with ZeaGen Inc. (formerly Coors Biotech, Inc.) to manufacture and market a FOS product under the trade name NutraFlora (sometimes called Neosugar).

FOS is used in Japan as a sweetening agent, flavor enhancer, bulking agent and humectant. The product is also added to Japanese "health foods" to promote the growth of "beneficial" bacteria in the lower gastro-intestinal tract.

SUMMARY OF THE INVENTION

Chewing gum products using fructooligosaccharides (FOS) and methods of making such gum products have been invented. In one embodiment, the FOS are used in a rolling compound applied to the chewing gum product. In a second embodiment, the FOS are used in a coating, such as a hard-shell coating, for a pellet gum. In a third embodiment, FOS are used in a centerfill of a chewing gum product. In a fourth embodiment, aspartame is used to sweeten the gum composition. Preferably the FOS are provided in an effective amount to stabilize the aspartame such that after eight weeks of storage at 85° F., at least 5% less aspartame decomposes than would have decomposed if the FOS were not included. FOS are also used as an encapsulating agent for high-intensity sweeteners or flavors used in gum compositions. In yet another embodiment, FOS are co-dried from a solution with another sweeteners selected from the group consisting of sugar sweeteners, alditol sweeteners and high potency sweeteners and used in a gum composition. In still another embodiment, FOS and a plasticyzing agent are coevapoarated to form a syrup that is used in a gum composition.

Even though FOS are very similar to sucrose, they are not cariogenic. Also, since they do not cause as great of gastrointestinal disturbances as polyolys, they give a highly consumer-acceptable chewing gum product.

DETAILED DESCRIPTION OF THE DRAWINGS AND PREFERRED EMBODIMENTS OF THE INVENTION

Figure 1:
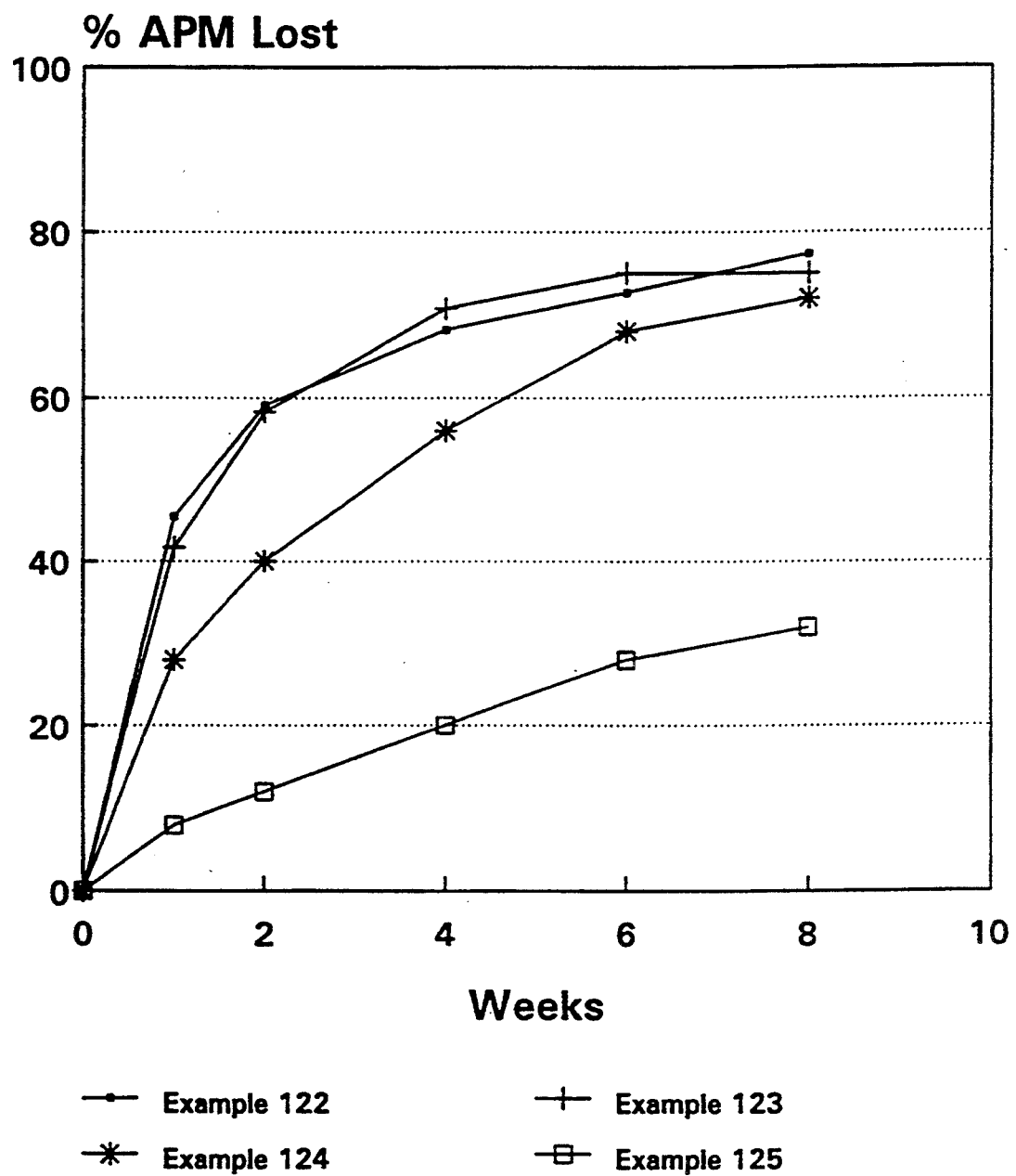
FIG. 1 shows test results of aspartame stability for gum made with FOS.

As used herein, the term "chewing gum" also includes bubble gum and the like. Unless otherwise specified, all percentages used herein are weight percents.

One FOS or fructooligosaccharide material is commercially available as a product called NutraFlora (sometimes called Neosugar). It is composed of a mixture of fructooligosaccharides (1-kestose, nystose, and 1-$\beta$-fructofuranosyl-nystose); sucrose (GF); glucose (G) and fructose (F). Each of the three fructooligosaccharides consists of one sucrose molecule (GF) with one, two or three additional fructose molecules linked in sequence by a (2-1)-$\beta$-glycosidic bond. 1-kestose (GF$_2$), nystose (GF$_3$), and 1-$\beta$-fructofuranosyl-nystose (GF$_4$) have one, two and three fructose molecules attached to the sucrose molecule, respectively.

NutraFlora brand FOS is available in two forms, NutraFlora and NutraFlora-G. NutraFlora is 96% (solids basis) fructooligosaccharides, 30% as sweet as sucrose, and is available as a clear syrup and a white powder. NutraFlora-G is less pure, 55% (solids basis) fructooligosaccharides with the remaining material being sucrose, glucose, and fructose. It is 60% as sweet as sucrose, and is available as a clear syrup. Both Nutra-Flora and NutraFlora-G are odorless and have no aftertaste. FOS is also being marketed worldwide under the tradename Oligo-Sugar by Cheil Foods & Chemicals Inc. of Seoul, Korea.

In a variety of extensive human and animal studies, FOS have been found to lack toxicity, carcinogenicity, and genotoxic effects.

In Japan, a FOS material called Meioligo has been approved for human consumption since 1983, and is currently used in 500 food products as an ingredient. In the United States, NutraFlora has been approved as GRAS (Generally Recognized As Safe) as a poultry feed supplement. ZeaGen Inc. of Broomfield, Colo., the company marketing NutraFlora in the U.S., is preparing a GRAS Affirmation Petition for NutraFlora as a human food ingredient. Approval for human consumption of FOS is also currently being pursued throughout the EEC.

NutraFlora, the fructooligosaccharides (FOS) material used in the following example, is produced on a commercial scale by the action of a fungal enzyme on sucrose, a process developed by Meiji Seika Kaisha of Japan. Other FOS containing materials are Raftiline and Raftilose, which are slightly different due to their source. Raftiline is the natural carbohydrate called inulin, which comes from various plants. Raftilose is an inulin hydrolyzate, also called an inulin-oligosaccharide. Raftiline is inulin obtained from chicory roots and is a mixture of GF$_n$ molecules where:

G = glucose
F = fructose
n = number of fructose units linked and ranging from about 2 to more than 50.

Raftilose, being the hydrolysis product from Raftiline, is composed of shorter length molecules of GF$_n$ (glucofructosan) and F$^m$ (fructosans) where "n" and "m" are about 2 to 9. NutraFlora contains mostly GF$_2$ (1-kestose) and GF$_3$ (nystose), with some GF$_4$ (1-$\beta$-fructofuranosyl-nystose).

FOS may be added to chewing gum in its solid or syrup form or may be dissolved in water. The solubility of FOS in water is about 70% at room temperature, but increases with increased temperature. FOS may be used in chewing gum as a texture and flavor modifier, bulking agent, and may improve texture, flavor, and shelf-life properties. FOS may replace solids like sucrose, dextrose or lactose when used in its powder form, or may replace syrups when used in its liquid or syrup form. At levels of about 0.5% to about 25%, FOS may replace part of the solids in sugar gum or, as a liquid, all or part of the syrup in sugar gum. At higher levels of about 25% to about 90% of the gum formulation, FOS may replace all of the solids in a chewing gum formulation.

In its powder or liquid form, a sufficient quantity of FOS can stabilize aspartame. At levels above 10%, FOS may replace significant quantities of sucrose and syrup. Because of the resulting lower sweetness, aspartame may be added. It has been found that aspartame is stabilized with FOS, especially when the FOS is used at a level of 10% or more of the gum. In preferred embodiments, an effective amount of FOS is used in gums with sweetness imparting amounts of aspartame to stabilize the aspartame against decomposition during storage at 85° F. for eight weeks whereby at least 5% less aspartame decomposes into non-sweetening derivatives than would have decomposed if the FOS were not included in the gum composition. Because aspartame has such high potency and is used at such low levels, and because of its high cost, even a 5% reduction in degradation is a significant benefit. While the aspartame contemplated will generally be unencapsulated, the term "unencapsulated" as used herein applies to aspartame which, even if treated or partially encapsulated, is still subject to some degradation in the gum formulation.

Although FOS is similar to sucrose and glucose polymers, its unique anti-caries properties suggest that it may be used in chewing gum formulations containing non-sugar ingredients. Non-sugar ingredients are alditols such as sorbitol, mannitol, xylitol, lactitol, palatinit (Isomalt), maltitol and hydrogenated starch hydrolyzates. These alditols are used in a variety of combinations to develop unique sugarless chewing gum formulations. FOS may be used to replace the individual alditols or combinations of alditols. With partial replacement of one or more alditols, FOS can be used at levels of about 0.5-25%. If FOS replaces a large amount or most of the alditols, this level may be about 25% to about 90% of the gum formulation.

Some sugar-free chewing gum formulations contain high levels of glycerin and are very low in moisture, i.e., less than about 2%. FOS as a powder or liquid may replace part or all of the glycerin used in these types of formulations. At higher moisture levels (more than 2%) in sugar-free gum, a liquid sorbitol (70% sorbitol, 30% water) is used. When using FOS, preferably sorbitol liquid may also be used to obtain soft textured gum formulations. Previous high moisture formulations containing liquid sorbitol were not made with aspartame, since the moisture caused degradation of aspartame. However, when sufficient FOS (generally greater than about 10%) is added to a high moisture gum, aspartame is stabilized, and degradation is reduced or eliminated.

Recent advances use hydrogenated starch hydrolyzates (HSH) and glycerin preblended and co-evaporated to reduce moisture in some sugar-free gum formulations. FOS may be used to replace part or all of the HSH/glycerin blends in such chewing gum formulations. Aqueous FOS solids and/or FOS syrup may also replace HSH in the preblend with glycerin and be co-evaporated with glycerin to obtain a low moisture, non-crystallizable blend. Combinations of FOS solids/syrup with alditols like sorbitol, maltitol, xylitol, lactitol and mannitol in aqueous form may also be blended with glycerin and co-evaporated for use in low-moisture, sugar-free gum.

FOS may be used in gum formulations with hydrogenated starch hydrolysates (HSH) without pre-blending with glycerin and coevaporation. Low levels of moisture are not necessary to prevent degradation of aspartame when FOS is used, so HSH syrups at about 20-30% moisture do not need to be modified to reduce moisture to improve aspartame stability.

FOS bulk sweetener may also be co-dried with a variety of sugars such as sucrose, dextrose, lactose, fructose and corn syrup solids and used in a sugar-containing gum formulation. FOS may be co-dried with a variety of alditols such as sorbitol, mannitol, xylitol, maltitol, palatinit and hydrogenated starch hydrolyzates and used in a sugar-free gum formulation. Co-drying refers to methods of co-crystallization and co-precipitation of FOS with other sugars and alditols, as well as co-drying by encapsulation, agglomeration, and absorption with other sugars and alditols.

Co-drying by encapsulation, agglomeration, and absorption can also include the use of encapsulating and agglomerating agents. FOS may be mixed with other sugars or alditols prior to being redried by encapsulation or agglomeration, or may be used alone with the encapsulating and agglomerating agents. These agents modify the physical properties of the bulk sweetener and control its release from chewing gum.

Three methods to obtain a controlled release of bulk sweetener are: (1) encapsulation by spray drying, fluid-bed coating, spray chilling and co-acervation to give full or partial encapsulation, (2) agglomeration to give partial encapsulation and (3) fixation or entrapment/absorption, which also gives partial encapsulation. These three methods, combined in any usable manner which physically isolates the bulk sweetener, reduces its dissolvability or slows down the release of bulk sweetener, are included in this invention.

FOS may act as an encapsulating or agglomerating agent. FOS may also be used to absorb other ingredients. FOS may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with FOS may improve the sweetener's shelf-life.

FOS may be used with other bulk sweeteners and in combination give unique properties. FOS may be co-dried by various delayed release methods noted above with other bulk sweeteners like sucrose, dextrose, lactose, maltose, fructose, corn syrup solids, sorbitol, mannitol, xylitol, maltitol, palatinit and hydrogenated starch hydrolysates for use in sugar and sugar-free chewing gum. Ingredients, including flavors, co-dried, encapsulated, agglomerated or absorbed on FOS may show faster release. However, encapsulation of flavors with FOS may improve the shelf-life of the flavor ingredient.

Other methods of treating the FOS bulk sweetener to physically isolate the sweetener from other chewing gum ingredients may also have some effect on its release rate and its effect on chewing gum flavor and texture.

The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using the bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the FOS bulk sweetener from other chewing gum ingredients is to add FOS to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises FOS bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of FOS bulk sweetener added to the rolling compound is about 0.5% to 100% of the rolling compound, or about 0.005% to about 5% of the chewing gum composition. This method of using FOS bulk sweetener in the chewing gum can allow a lower usage level of the bulk sweetener, can give the bulk sweetener a more controlled release rate, and can reduce or eliminate any possible reaction of the bulk sweetener with gum base, flavor components or other components, yielding improved shelf stability.

Another method of isolating FOS sweetener is to use it in the coating/panning of a pellet chewing gum. Pellet or ball gum is prepared as conventional chewing gum, but formed into pellets that are pillow shaped or into balls. The pellets/balls can then be coated or panned by conventional panning techniques to make a unique coated pellet gum.

Conventional panning procedures generally apply a liquid coating to a pellet, which is then solidified, usually by drying the coating. The coating layer is built up by successive coating and drying steps.

FOS are very stable and highly water soluble, and can be easily added to a sugar solution prepared for sugar panning. FOS may be added in a liquid form to the sucrose coating or any other sugar or alditol coating. FOS can also be added as a powder blended with other powders often used in some types of conventional panning procedures. Using FOS sweetener isolates it from other gum ingredients and modifies its release rate in chewing gum. Levels of use of FOS may be about 0.1% to about 20% in the coating and about 0.05% to about 10% of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, palatinose, xylitol, lactitol, palatinit and other new alditols or a combination thereof. These materials may be blended with panning modifiers including, but not limited to, gum arabic, maltodextrins, corn syrup, gelatin, cellulose derivatives like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate and talc. FOS may also act as a panning modifier with other panning materials to improve product quality. Antitack agents may also be added as panning modifiers, which allow the use of a variety of carbohydrates and sugar alcohols to be used in the development of new panned or coated gum products. Flavors may also be added with the sugar coating and with the FOS bulk sweetener to yield unique product characteristics.

Another method to improve coating processes using sugars or alditols is to add a powder coating after a liquid coating. The powder coating may include FOS, maltodextrin, gelatin, cellulose derivatives, starches, modified starches, vegetable gums and fillers like talc and calcium carbonate. This will reduce stickiness and allow a faster build-up of coating.

FOS may be added to the liquid syrup and used as a panning modifier with other sugar and sugar alcohol syrups such as dextrose, sucrose, xylitol and palatinit. FOS may act as a binder to, and film former for, the sugar or sugar alcohol coating.

The previously described FOS bulk sweetener may readily be incorporated into a chewing gum composition. The remainder of the chewing gum ingredients are noncritical to the present invention. That is, the bulk sweetener can be incorporated into conventional chewing gum formulations in a conventional manner. The FOS bulk sweetener may be used in a sugar-free or sugar chewing gum to modify the sweetness thereof. The bulk sweetener may be used in either regular chewing gum or bubble gum. Higher levels of FOS will reduce sweetness, thus allowing for its use in non-sweet flavored chewing gums such as snack flavors or savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to about 90%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the FOS solid/syrup bulk sweetener of the present invention may be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The FOS bulk sweetener of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-stability needed, the FOS solid/syrup bulk sweeteners of the present invention can also be used in combination with coated or uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which FOS can be added to gum after it is dissolved in water and mixed with various aqueous solvents. Aspartame (APM), which is stabilized with FOS, may also be added to the formula. Generally, APM is added to the gum at a level of about 0.005% to about 1% of the gum composition.

TABLE 1

| | EX. 1 | EX. 2 | EX. 3 | EX. 4 | EX. 5 | EX. 6 | EX. 7 | EX. 8 |
|---|---|---|---|---|---|---|---|---|
| SUGAR | 55.6 | 56.6 | 55.6 | 47.0 | 53.0 | 53.0 | 55.5 | 47.0 |
| BASE | 19.2 | 19.2 | 19.2 | 19.2 | 19.2 | 19.2 | 19.2 | 19.2 |
| CORN SYRUP | 12.8 | 1.8 | 8.8 | 2.8 | 6.8 | 6.8 | 0.0 | 2.8 |
| PEPPERMINT FLAVOR | 0.9 | 0.9 | 0.9 | 0.9 | 0.9 | 0.9 | 0.9 | 0.9 |
| GLYCERYN | 1.4 | 1.4 | 1.4 | 0.0 | 0.0 | 0.0 | 1.4 | 0.0 |
| LIQUID/FOS BLEND | 10.0 | 20.0 | 14.0 | 30.0 | 20.0 | 20.0 | 22.9 | 30.0 |

TABLE 1-continued

| | EX. 1 | EX. 2 | EX. 3 | EX. 4 | EX. 5 | EX. 6 | EX. 7 | EX. 8 |
|---|---|---|---|---|---|---|---|---|
| APM | 0.1 | 0.1 | 0.1 | 0.1 | 0.1 | 0.1 | 0.1 | 0.1 |

EXAMPLE 1

FOS powder can be added directly to the gum.

EXAMPLE 2

An 80 gram portion of FOS can be dissolved in 120 grams of water at 40° C. making a 40% solution and added to gum.

EXAMPLE 3

FOS syrup at 70% solids can be added directly to the gum.

EXAMPLE 4

A blend of 80 grams of FOS and 120 grams of water is mixed at 40° C. To this is added 100 grams of glycerin to give a mixture of 27% FOS, 40% water, and 33% glycerin, and added to gum.

EXAMPLE 5

To 140 grams of FOS syrup at 70% solids is added 60 grams of glycerin to give a 70% FOS syrup with 30% glycerin, and added to gum.

EXAMPLE 6

To 140 grams of FOS syrup of 70% solids is added 60 grams of propylene glycol giving a 70% FOS syrup with 30% glycerin and added to gum.

EXAMPLE 7

To 140 grams of FOS syrup at 70% solids is added 89 grams of corn syrup and blended giving a mixture of 61% FOS syrup and 39% corn syrup.

EXAMPLE 8

To a 200 gram quantity of corn syrup is added 100 grams of glycerin. To this mixture is added 75 grams of FOS and blended at 50° C. This mixture is added to gum.

In the next examples of sugar gum formulations, FOS can be dissolved in water and emulsifiers can be added to the aqueous solution. Example solutions can be prepared by dissolving 15 grams of FOS in 70 grams water and adding 15 grams of emulsifiers of various hydrophilic-lipophilic balance (HLB) values to the solution. The mixtures can then be used in the following formulas. (Note: the solution of Example 9 does not contain any emulsifier.)

TABLE 2

| | EX. 9 | EX. 10 | EX. 11 | EX. 12 | EX. 13 | EX. 14 |
|---|---|---|---|---|---|---|
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.8 | 12.8 | 12.8 | 12.8 | 12.8 | 12.8 |
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| PEPP. FLAVOR | 0.9 | 0.9 | 0.9 | 0.9 | 0.9 | 0.9 |
| APM | 0.1 | 0.1 | 0.1 | 0.1 | 0.1 | 0.1 |
| BULK SWEETENER/ EMULSIFIER/WATER MIXTURE | 5.0 | 5.0 | 5.0 | 5.0 | 5.0 | 5.0 |
| EMULSIFIER | None | HLB = 2 | HLB = 4 | HLB = 6 | HLB = 9 | HLB = 12 |

EXAMPLES 15-20

The same as the formulations made in Examples 9-14, respectively, except that the flavor can be mixed together with the aqueous bulk sweetener solution before adding the mixture to the gum batch.

The following Tables 3 through 10 are examples of gum formulations that demonstrate formula variations in which FOS may be used. Formulas with high levels of FOS may also contain aspartame (APM), which is stabilized with FOS.

Examples 21-25 in Table 3 demonstrates the use of FOS in low moisture sugar formulations having less than 2% theoretical moisture:

TABLE 3

|  | EX. 21 | EX. 22 | EX. 23 | EX. 24 | EX. 25 |
|---|---|---|---|---|---|
| SUGAR | 57.9 | 53.9 | 46.9 | 23.0 | 0.0 |
| GUM BASE | 19.2 | 19.2 | 19.2 | 19.2 | 19.2 |
| CORN SYRUP[a] | 6.0 | 6.0 | 6.0 | 6.0 | 4.0 |
| DEXTROSE MONOHYDRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 6.9 | 10.7 | 10.6 |
| FLAVOR | 0.9 | 0.9 | 0.9 | 0.9 | 0.9 |
| FOS | 1.0 | 5.0 | 10.0 | 25.0 | 50.0 |
| APM | — | — | 0.1 | 0.2 | 0.3 |

[a]Corn syrup is evaporated to 85% solids, 15% moisture
[b]Glycerin and syrup may be blended and co-evaporated Examples 26-30 in Table 4 demonstrate the use of FOS in medium-moisture sugar formulations having about 2% to about 5% moisture.

TABLE 4

|  | EX. 26 | EX. 27 | EX. 28 | EX. 29 | EX. 30 |
|---|---|---|---|---|---|
| SUGAR | 52.5 | 46.5 | 40.5 | 20.0 | 0.0 |
| GUM BASE | 19.2 | 19.2 | 19.2 | 19.2 | 19.2 |
| CORN SYRUP[a] | 15.0 | 15.0 | 14.9 | 18.3 | 18.2 |
| DEXTROSE MONOHYDRATE | 10.0 | 10.0 | 10.0 | 10.0 | 5.0 |
| GLYCERIN[b] | 1.4 | 3.4 | 4.4 | 6.4 | 6.4 |
| FLAVOR | 0.9 | 0.9 | 0.9 | 0.9 | 0.9 |
| FOS | 1.0 | 5.0 | 10.0 | 25.0 | 50.0 |
| APM | — | — | 0.1 | 0.2 | 0.3 |

[a]Corn syrup is evaporated to 85% solids, 15% moisture
[b]Glycerin and syrup may be blended and co-evaporated Examples 31-35 in Table 5 demonstrate the use of FOS in high-moisture sugar formulations having more than about 5% moisture.

TABLE 5

|  | EX. 31 | EX. 32 | EX. 33 | EX. 34 | EX. 35 |
|---|---|---|---|---|---|
| SUGAR | 50.0 | 44.0 | 38.0 | 20.0 | 0.0 |
| GUM BASE | 24.0 | 24.0 | 24.0 | 24.0 | 24.0 |
| CORN SYRUP | 24.0 | 24.0 | 23.9 | 24.4 | 19.3 |
| GLYCERIN | 0.0 | 2.0 | 3.0 | 5.4 | 5.4 |
| FLAVOR | 1.0 | 1.0 | 1.0 | 1.0 | 1.0 |
| FOS | 1.0 | 5.0 | 10.0 | 25.0 | 50.0 |
| APM | — | — | 0.1 | 0.2 | 0.3 |

Examples 36-40 in Table 6 and Examples 41-50 in Tables 7 and 8 demonstrate the use of FOS in low- and high-moisture gums that are sugar-free. Low-moisture gums have less than about 2% moisture, and high-moisture gums have greater than 2% moisture.

TABLE 6

|  | EX. 36 | EX. 37 | EX. 38 | EX. 39 | EX. 40 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 13.0 |
| GLYCERIN | 10.0 | 10.0 | 9.9 | 9.8 | 9.7 |
| FLAVOR | 1.5 | 1.5 | 1.5 | 1.5 | 1.5 |
| FOS | 1.0 | 5.0 | 10.0 | 25.0 | 50.0 |
| APM | — | — | 0.1 | 0.2 | 0.3 |

TABLE 7

|  | EX. 41 | EX. 42 | EX. 43 | EX. 44 | EX. 45 |
|---|---|---|---|---|---|
| BASE | 25.5 | 25.5 | 25.5 | 25.5 | 25.5 |
| SORBITOL | 50.0 | 46.0 | 39.0 | 23.0 | 0.0 |
| LIQUID SORBITOL* | 10.0 | 10.0 | 10.0 | 10.0 | 11.0 |
| MANNITOL | 10.0 | 10.0 | 10.0 | 10.0 | 5.0 |
| GLYCERIN | 2.0 | 2.0 | 3.9 | 4.8 | 6.7 |
| FLAVOR | 1.5 | 1.5 | 1.5 | 1.5 | 1.5 |
| FOS | 1.0 | 5.0 | 10.0 | 25.0 | 50.0 |
| APM | — | — | 0.1 | 0.2 | 0.3 |

*Sorbitol liquid contains 70% sorbitol, 30% water

TABLE 8

|  | EX. 46 | EX. 47 | EX. 48 | EX. 49 | EX. 50 |
|---|---|---|---|---|---|
| BASE | 25.5 | 25.5 | 25.5 | 25.5 | 25.5 |
| SORBITOL | 50.0 | 46.0 | 41.0 | 24.0 | 0.0 |
| HSH SYRUP* | 10.0 | 10.0 | 10.0 | 10.0 | 10.0 |
| MANNITOL | 8.0 | 8.0 | 7.9 | 7.8 | 4.7 |
| GLYCERIN** | 4.0 | 4.0 | 4.0 | 6.0 | 8.0 |
| FLAVOR | 1.5 | 1.5 | 1.5 | 1.5 | 1.5 |
| FOS | 1.0 | 5.0 | 10.0 | 25.0 | 50.0 |
| APM | — | — | 0.1 | 0.2 | 0.3 |

*Hydrogenated starch hydrolysate syrup
**Glycerin and HSH syrup may be blended or co-evaporated Table 9 shows sugar chewing gum formulations that can be made with various types of sugars.

TABLE 9

|  | EX. 51 | EX. 52 | EX. 53 | EX. 54 | EX. 55 | EX. 56 |
|---|---|---|---|---|---|---|
| GUM BASE | 19.2 | 19.2 | 19.2 | 19.2 | 19.2 | 19.2 |
| SUCROSE | 44.4 | 21.2 | 39.4 | 16.2 | 29.4 | 16.2 |
| GLYCERIN | 1.4 | 4.4 | 1.4 | 4.4 | 1.4 | 4.4 |
| CORN SYRUP | 14.0 | 14.0 | 14.0 | 14.0 | 14.0 | 14.0 |
| DEXTROSE | 5.0 | 5.0 | — | — | 10.0 | 5.0 |
| LACTOSE | 5.0 | 5.0 | 10.0 | 10.0 | — | — |
| FRUCTOSE | 5.0 | 5.0 | 10.0 | 10.0 | 10.0 | 5.0 |
| INVERT SUGAR | — | — | — | — | 10.0 | 10.0 |
| MALTOSE | — | — | — | — | — | — |
| CORN SYRUP SOLIDS | — | — | — | — | — | — |
| PEPPERMINT FLAVOR | 0.9 | 0.9 | 0.9 | 0.9 | 0.9 | 0.9 |
| FOS | 5.0 | 25.0 | 5.0 | 25.0 | 5.0 | 25.0 |
| APM | 0.1 | 0.3 | 0.1 | 0.3 | 0.1 | 0.3 |
|  | EX. 57 | EX. 58 | EX. 59 | EX. 60 | EX. 61 | EX. 62 |
| GUM BASE | 19.2 | 19.2 | 19.2 | 19.2 | 19.2 | 19.2 |
| SUCROSE | 29.4 | 16.2 | 29.4 | 16.2 | 37.4 | 19.2 |
| GLYCERIN | 1.4 | 4.4 | 1.4 | 4.4 | 1.4 | 4.4 |
| CORN SYRUP | 14.0 | 14.0 | 14.0 | 14.0 | 11.0 | 11.0 |
| DEXTROSE | 10.0 | 5.0 | 10.0 | 5.0 | 10.0 | 5.0 |
| LACTOSE | — | — | — | — | — | — |
| FRUCTOSE | 10.0 | 5.0 | 10.0 | 5.0 | 5.0 | 5.0 |
| INVERT SUGAR | 10.0 | 10.0 | — | — | 5.0 | 5.0 |
| MALTOSE | — | — | 10.0 | 10.0 | — | — |
| CORN SYRUP SOLIDS | — | — | — | — | 5.0 | 5.0 |
| PEPPERMINT FLAVOR | 0.9 | 0.9 | 0.9 | 0.9 | 0.9 | 0.9 |
| FOS | 5.0 | 25.0 | 5.0 | 25.0 | 5.0 | 25.0 |
| APM | 0.1 | 0.3 | 0.1 | 0.3 | 0.1 | 0.3 |

Any of the sugars may be combined with FOS and co-dried to form unique combinations such as:

EXAMPLE 63

Dextrose and FOS can be dissolved in water in a 2:1 ratio dextrose:FOS and co-dried or co-precipitated and used in the formulas in Table 9.

EXAMPLE 64

FOS and sucrose can be dissolved in water in a 1:1 ratio and co-dried or co-precipitated and used in the formulas in Table 9.

EXAMPLE 65

FOS, sucrose and dextrose can be dissolved in water in a 1:1:1 ratio and co-dried or co-precipitated and used in the formulas in Table 9.

EXAMPLE 66

FOS, sucrose, dextrose and fructose can be dissolved in water at 25% of each ingredient and co-dried, and used in the formulas in Table 9.

EXAMPLE 67

FOS, dextrose, fructose and lactose can be dissolved in water at 25% of each ingredient and co-dried, and used in the formulas in Table 9.

EXAMPLE 68

FOS, dextrose, maltose and corn syrup solids can be dissolved in water at 25% of each ingredient and co-dried, and used in the formulas in Table 9.

EXAMPLE 69

FOS, sucrose, dextrose, maltose and fructose can be dissolved in water at 20% of each ingredient and co-dried, and used in the formulas in Table 9.

Multiple combinations of FOS with other sugars can be made in solution to form liquid concentrates that do not need to be co-dried, such as:

EXAMPLE 70

FOS, corn syrup and glycerin can be dissolved in water at a ratio of 1:1:1, evaporated to a thick syrup and used in the formulas in Table 9.

EXAMPLE 71

FOS, dextrose, fructose and invert syrup may be dissolved in water at 25% of each ingredient and evaporated to a thick syrup and used in the formulas in Table 9.

EXAMPLE 72

FOS, dextrose, maltose and corn syrup solids may be dissolved in water at 25% of each component and evaporated to a thick syrup and used in the formulas in Table 9.

EXAMPLE 73

Glycerin is added to Example 71 at a ratio of 4:1 syrup to glycerin and evaporated to a thick syrup, and used in the formulas in Table 9.

EXAMPLE 74

Glycerin is added to Example 72 at a ratio of 2:1 syrup to glycerin and evaporated to a thick syrup, and used in the formulas in Table 9.

Table 10 shows chewing gum formulations that are free of sugar. These formulations can use a wide variety of non-sugar alditols, including Lycasin brand HSH syrup.

TABLE 10

|  | EX. 75 | EX. 76 | EX. 77 | EX. 78 | EX. 79 | EX. 80 |
|---|---|---|---|---|---|---|
| GUM BASE | 25.5 | 25.5 | 25.5 | 25.5 | 25.5 | 25.5 |
| GLYCERIN | 1.9 | 3.7 | 1.9 | 3.7 | 1.9 | 4.7 |
| SORBITOL | 44.0 | 12.0 | 34.0 | 7.0 | 28.0 | — |
| MANNITOL | — | 10.0 | 10.0 | 10.0 | 10.0 | 3.0 |
| SORBITOL LIQUID | 17.0 | 17.0 | — | — | — | — |
| LYCASIN | — | — | 17.0 | 12.0 | 8.0 | 10.0 |
| MALTITOL | — | — | — | 10.0 | — | — |
| XYLITOL | — | — | — | — | 15.0 | 15.0 |
| LACTITOL | — | — | — | — | — | — |
| PALATINIT | — | — | — | — | — | — |
| FLAVOR | 1.5 | 1.5 | 1.5 | 1.5 | 1.5 | 1.5 |
| FOS | 10.0 | 30.0 | 10.0 | 30.0 | 10.0 | 40.0 |
| APM | 0.1 | 0.3 | 0.1 | 0.3 | 0.1 | 0.3 |
|  | EX. 81 | EX. 82 | EX. 83 | EX. 84 | EX. 85 | EX. 86 |
| GUM BASE | 25.5 | 25.5 | 25.5 | 25.5 | 25.5 | 25.5 |
| GLYCERIN | 7.9 | 7.7 | 7.9 | 7.7 | 7.7 | 4.7 |
| SORBITOL | 32.0 | 7.0 | 22.0 | 5.0 | 5.0 | — |
| MANNITOL | 8.0 | 8.0 | 8.0 | — | — | — |
| SORBITOL LIQUID | 5.0 | — | — | — | — | — |
| LYCASIN | — | 5.0 | 5.0 | 5.0 | 10.0 | 10.0 |
| MALTITOL | — | 5.0 | — | — | — | — |
| XYLITOL | — | — | — | 15.0 | — | — |
| LACTITOL | 10.0 | 10.0 | 10.0 | — | — | — |
| PALATINIT | — | — | 10.0 | 10.0 | 25.0 | 18.0 |
| FLAVOR | 1.5 | 1.5 | 1.5 | 1.5 | 1.5 | 1.5 |
| FOS | 10.0 | 30.0 | 10.0 | 30.0 | 25.0 | 40.0 |
| APM | 0.1 | 0.3 | 0.1 | 0.3 | 0.3 | 0.3 |

Any of the alditols can be combined with FOS and co-dried to form unique combinations, such as:

EXAMPLE 87

FOS and sorbitol can be dissolved in water in a ratio of 2:1 sorbitol:FOS and co-dried and used in formulas in Table 10.

EXAMPLE 88

FOS, sorbitol and mannitol can be dissolved in water at a ratio of 1:1:1, co-dried, and used in appropriate formulas in Table 10.

EXAMPLE 89

FOS, mannitol and xylitol can be dissolved in water at a ratio of 1:1:1, co-dried, and used in appropriate formulas in Table 10.

EXAMPLE 90

FOS, sorbitol and lactitol can be dissolved in water at a ratio of 1:1:1, co-dried, and used in appropriate formulas in Table 10.

EXAMPLE 91

FOS, palatinit and sorbitol can be dissolved in water at a ratio of 1:1:1, co-dried, and used in appropriate formulas in Table 10.

EXAMPLE 92

FOS and palatinit can be dissolved in water at a ratio of 1:1, co-dried, and used in appropriate formulas in Table 10.

EXAMPLE 93

FOS, sorbitol, maltitol and xylitol may be blended at 25% of each ingredient and dissolved in water, co-dried, and used in appropriate formulas in Table 10.

Multiple combinations of FOS with the various alditols can be made in solution to form liquid concentrates that do not need to be co-dried, such as:

EXAMPLE 94

FOS, sorbitol, maltitol and Lycasin may be dissolved in water at 25% of each ingredient, evaporated to a thick syrup and used in the appropriate formulas in Table 10.

EXAMPLE 95

FOS, xylitol, sorbitol and Lycasin can be dissolved in water at 25% of each ingredient, evaporated to a thick syrup, and used in the formulas in Table 10.

EXAMPLE 96

FOS, sorbitol, lactitol and Lycasin can be dissolved in water at 25% of each ingredient, evaporated to a thick syrup, and used in the formulas in Table 10.

EXAMPLE 97

FOS, Lycasin and glycerin can be dissolved in water at a ratio of 1:1:1, evaporated to a thick syrup and used in the formulas in Table 10.

EXAMPLE 98

Glycerin is added to Example 94 at a ratio of 4:1 syrup to glycerin, evaporated to a thick syrup, and used in formulas in Table 10.

EXAMPLE 99

Glycerin is added to Example 95 at a ratio of 4:1 syrup to glycerin, evaporated to a thick syrup, and used in the formulas in Table 10.

EXAMPLE 100

Glycerin is added to Example 96 at a ratio of 4:1 syrup to glycerin, evaporated to a thick syrup, and used in formulas in Table 10.

Other high-intensity sweeteners such as acesulfame K, or the salts of acesulfame, cyclamate and its salts, saccharin and its salts, alitame, sucralose, thaumatin, monellin, dihydrochalcone, stevioside, glycyrrhizin, and combinations thereof may be used in any of the Examples listed in Tables 3, 4, 5, 6, 7, 8 and 10. Since FOS has less sweetness than some of the sugars used in sugar gum, and some of the alditols in sugar-free gum, a high-intensity sweetener may be needed to obtain the proper level of sweetness.

High-intensity sweeteners may also be modified to control their release in chewing gum formulations containing FOS. This can be controlled by various methods of encapsulation, agglomeration, absorption, or a combination of methods to obtain either a fast or slow release of the sweetener. Sweetener combinations, some of which may be synergistic, may also be included in the gum formulations containing FOS. FOS may also be used to encapsulate, agglomerate, absorb, or entrap any high-intensity sweetener to control its release.

The following examples show the use of high-intensity sweeteners in chewing gum formulations with FOS.

EXAMPLE 101

Alitame at a level of 0.03% may be added to any of the formulas in Tables 3 through 10 by replacing 0.03% of the FOS.

EXAMPLE 102

Sucralose at a level of 0.07% may be added to any of the formulas in Tables 3 through 10 by replacing 0.07% of the FOS.

EXAMPLE 103

Thaumatin at a level of 0.02% may be added to any of the formulas in Tables 3 through 10 by replacing 0.02% of the FOS.

EXAMPLE 104

Glycyrrhizin at a level of 0.4% may be added to any of the formulas in Tables 3 through 10 by replacing 0.4% of the FOS.

High-intensity sweeteners may also be combined with other high-intensity sweeteners, with or without encapsulation, agglomeration or absorption, and used in chewing gum. Examples are:

EXAMPLE 105

Aspartame and acesulfame K at a 1:1 ratio may be added to any of the formulas in Tables 3 through 10 at a level of 0.15% by replacing 0.15% of the FOS.

EXAMPLE 106

Aspartame and alitame at a ratio of 9:1 aspartame: alitame may be added to any of the formulas in Tables 3 through 10 at a level of 0.1% by replacing 0.1% of the FOS.

EXAMPLE 107

Aspartame and thaumatin at a ratio of 9:1 aspartame:-thaumatin can be added to any of the formulas in Tables 3 through 10 at a level of 0.1% by replacing 0.1% of the FOS.

EXAMPLE 108

Sucralose and alitame in a ratio of 3:1 sucralose: alitame can be added to any of the formulas in Tables 3 through 10 at a level of 0.5% by replacing 0.5% of the FOS.

EXAMPLE 109

Alitame and glycyrrhizin in a ratio of 1:12 alitame:-glycyrrhizin can be added to any of the formulas in Tables 3 through 10 at a level of 0.1% by replacing 0.1% of the FOS.

EXAMPLE 110

Aspartame and glycyrrhizin in a ratio of 1:14 aspartame:glycyrrhizin can be added to any of the formulas in Tables 3 through 10 at a level of 0.3% by replacing 0.3% of the FOS.

As discussed above, the four types of FOS ingredients that are available are NutraFlora powder, NutraFlora syrup, NutraFlora-G syrup and Oligo-Sugar. These materials may be used exclusively in a variety of chewing gum formulations, as in Tables 11 and 12. The formulas with FOS and APM will show improved APM stability.

TABLE 11

|  | EX. 111 | EX. 112 | EX. 113 | EX. 114 | EX. 115 |
|---|---|---|---|---|---|
| GUM BASE | 19.2 | 25.5 | 25.5 | 25.5 | 40.0 |
| GLYCERIN | 4.0 | 4.0 | 7.0 | 7.0 | 7.0 |
| NUTRAFLORA POWDER* | 55.8 | 49.0 | 46.0 | 46.0 | 30.5 |

TABLE 11-continued

|  | EX. 111 | EX. 112 | EX. 113 | EX. 114 | EX. 115 |
|---|---|---|---|---|---|
| NUTRAFLORA-G SYRUP* | 10.0 | 15.0 | 5.0 | — | 10.0 |
| NUTRAFLORA SYRUP* | 10.0 | 5.0 | 15.0 | 20.0 | 10.0 |
| FLAVOR | 1.0 | 1.5 | 1.5 | 1.5 | 2.5 |

*NutraFlora powder, NutraFlora syrup, and NutraFlora-G may also be preblended with glycerin and coevaporated to reduce moisture.

TABLE 12

|  | EX. 116 | EX. 117 | EX. 118 | EX. 119 | EX. 120 | EX. 121 |
|---|---|---|---|---|---|---|
| GUM BASE | 25.5 | 25.5 | 25.5 | 25.5 | 50.0 | 70.0 |
| GLYCERIN | 2.0 | 7.0 | 7.0 | 15.0 | 2.0 | 1.0 |
| NUTRAFLORA POWDER* | 51.0 | 56.0 | 46.0 | 43.0 | 35.5 | 20.0 |
| NUTRAFLORA SYRUP* | 20.0 | 10.0 | 5.0 | — | 10.0 | 4.0 |
| NUTRAFLORA-G SYRUP* | — | — | 15.0 | 15.0 | — | 2.0 |
| FLAVOR | 1.5 | 1.5 | 1.5 | 1.5 | 2.5 | 3.0 |

*NutraFlora powder, NutraFlora syrup, and NutraFlora-G may also be preblended with glycerin and coevaporated to reduce moisture.

The formulations in Tables 11 and 12 do not contain other sugars or alditols. These formulations will give unique texture and flavor attributes. These formulations may also contain other high-intensity, artificial sweeteners, from about 0.02% to about 0.1% for sweeteners like alitame, thaumatin, and dihydrochalcone, and from about 0.1% to about 0.3% for sweeteners like sucralose, acesulfame, and saccharin. The formulations in Tables 11 and 12 without the other types of sugars and alditols will also have good non-cariogenic properties.

EXAMPLES 122–125

The following gum formulations were made:

|  | EX. 122 | EX. 123 | EX. 124 | EX. 125 |
|---|---|---|---|---|
| BASE | 27.0 | 27.0 | 27.0 | 27.0 |
| SORBITOL | 40.2 | 38.7 | 32.5 | 20.9 |
| MANNITOL | 12.0 | 11.5 | 9.7 | 6.3 |
| GLYCERIN | 8.1 | 8.1 | 8.1 | 8.1 |
| SORBITOL LIQUID | 11.0 | 11.0 | 11.0 | 11.0 |
| PEPPERMINT FLAVOR | 1.3 | 1.3 | 1.3 | 1.3 |
| COLOR | 0.1 | 0.1 | 0.1 | 0.1 |
| APM | 0.3 | 0.3 | 0.3 | 0.3 |
| NUTRAFLORA POWDER | 0 | 2.0 | 10.0 | 25.0 |

These formulas were made in a conventional lab mixer in a conventional manner on a lab scale and formed into square pellets. Samples of each formula were placed in six sealed pouches and stored at 85° F. for 0, 1, 2, 4, 6 and 8 weeks. Samples were then removed and analyzed for APM to determine degradation. The test results are shown in FIG. 1. As shown, after eight weeks of storage at 85° F., at levels of 10% or greater of FOS, there was a significant increase in the stability of APM. Even at 2% FOS (Example 123), there was almost a 10% increase in the amount of APM remaining after eight weeks of storage compared to the sample with no FOS (Example 122).

EXAMPLES 126–133

The following gum formulations were made:

|  | EX. 126 | EX. 127 | EX. 128 | EX. 129 | EX. 130 | EX. 131 | EX. 132 | EX. 133 |
|---|---|---|---|---|---|---|---|---|
| BASE | 24.7 | 24.7 | 24.7 | 24.7 | 24.7 | 24.7 | 24.7 | 24.7 |
| SORBITOL | 50.0 | 50.0 | 45.0 | 35.0 | 24.7 | 35.0 | 24.7 | 35.0 |
| MANNITOL | 9.4 | 7.0 | 9.4 | 9.4 | 9.4 | 7.0 | 7.0 | 9.4 |
| GLYCERIN | 2.0 | 2.0 | 2.0 | 2.0 | 2.0 | 2.0 | 2.0 | 5.0 |
| LECITHIN | 0.2 | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 | 1.4 |
| APM | 0.3 | 0.3 | 0.3 | 0.3 | 0.3 | 0.3 | 0.3 | 0.3 |
| LYCASIN | — | 14.4 | — | — | — | 14.4 | 14.4 | — |
| LIQUID SORBITOL | 12.0 | — | 12.0 | 12.0 | 12.0 | — | — | 9.0 |
| NUTRAFLORA | — | — | 5.0 | 15.0 | 40.0 | 15.0 | 40.0 | 15.0 |

Figure 2:
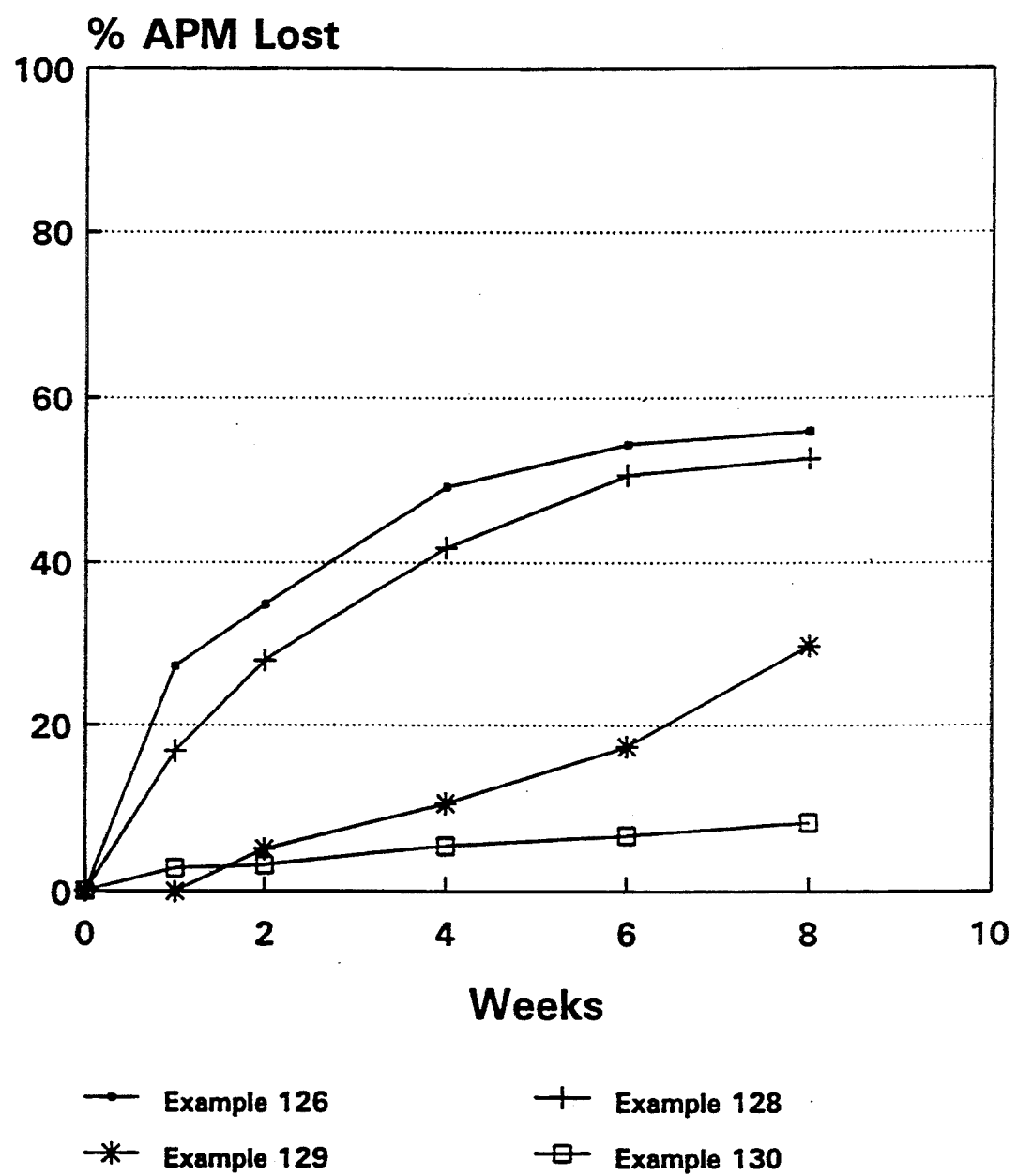
FIG. 2 shows test results of aspartame stability for gum made with sorbitol liquid and FOS.
Figure 3:
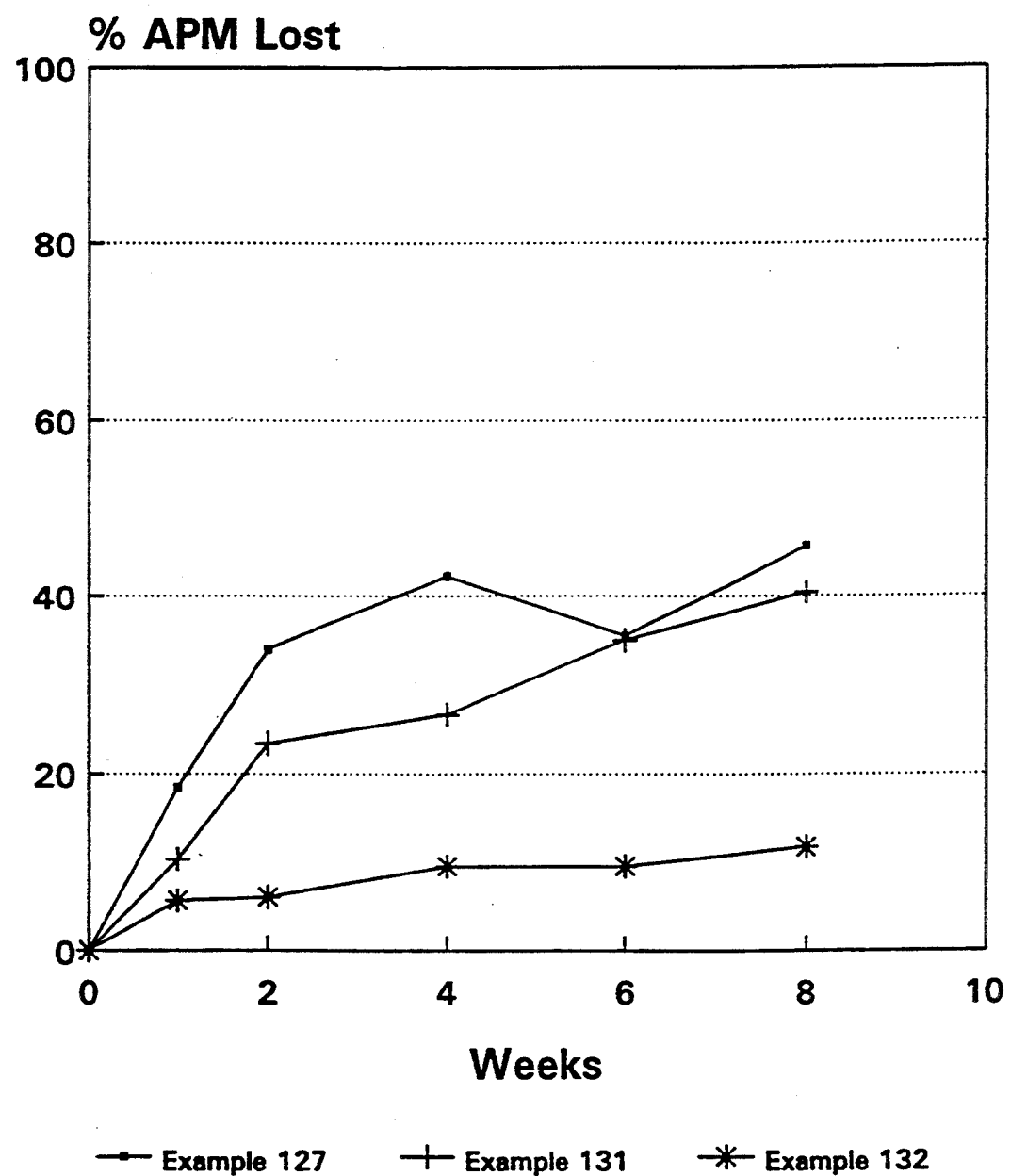
FIG. 3 shows test results of aspartame stability for gum made with Lycasin brand HSH syrup and FOS.

These formulas were made in a conventional lab mixer in a conventional manner and formed into square pellets. Samples of each formula were placed in four sealed pouches and stored at 85° F. for 0, 1, 2, 4, 6 and 8 weeks. Samples were then removed and analyzed for APM to determine degradation. The test results for Examples 126, 128, 129 and 130 are shown in FIG. 2 for gum made with sorbitol liquid, and the test results for Examples 127, 131 and 132 are shown in FIG. 3 for gum made with Lycasin brand HSH syrup. Results show that in both types of formulations, FOS improves APM stability significantly as compared to when a FOS material is not used. As seen in both FIGS. 2 and 3, after eight weeks of storage at 85° F., there was more than a 5% decrease in the amount of aspartame that decomposed in the gum formulas that includes FOS. Also, Examples 130 and 132 produced a gum composition in which the FOS were effective such that after eight weeks of storage, over 80% of the unencapsulated aspartame originally formulated in the gum composition remained undecomposed.

EXAMPLE 134

The following sugar gum center formulation was made:

|  | % |
|---|---|
| Base | 24.8 |
| Sugar | 52.0 |
| Corn Syrup | 22.4 |
| Peppermint Flavor | 0.8 |
|  | 100 |

This formulation was made in a 25 gallon standard gum mixer and sheeted as rectangular pellets for coating tests.

Two sugar solutions were prepared for use in coating tests. They are:

| A) 750 grams sugar | B) 650 grams sugar |
|---|---|
| 250 grams water | 350 grams water |
| 30 grams NutraFlora |  |

In a 12 inch lab coating pan, 1,000 grams of the above centers were coated with Solution A up to a level of 20% coating, then coating continued with Solution B until a 33% coating was achieved. As coating progressed, ten pieces were weighed to determine the coating weight increase to 20%, then 33%. During the coating process, Solution A was tacky like other types of coatings which contain gum arabic, maltodextrins or modified starches, but it is anticipated that NutraFlora will give good shelf life protection.

The final coated product had a hard, crunchy shell that was slightly off-white in color. The flavor had a creamy character, comparable to typical sugar coated pellet gum.

EXAMPLES 135–138

The following gum formulations were prepared using NutraFlora powder (FOS):

|  | EX. 135 | EX. 136 | EX. 137 | EX. 138 |
|---|---|---|---|---|
| BASE | 19.2 | 19.2 | 19.2 | 19.2 |
| 45.5 Be SYRUP | 18.5 | 18.5 | 18.5 | 18.5 |
| GLYCERIN | 1.4 | 1.4 | 1.4 | 1.4 |
| SUGAR | 50.0 | 48.0 | 45.0 | 40.0 |
| DEXTROSE MONOHYDRATE | 10.0 | 10.0 | 10.0 | 10.0 |
| PEPPERMINT FLAVOR | 0.9 | 0.9 | 0.9 | 0.9 |
| FOS | — | 2.0 | 5.0 | 10.0 |

Figure 4:
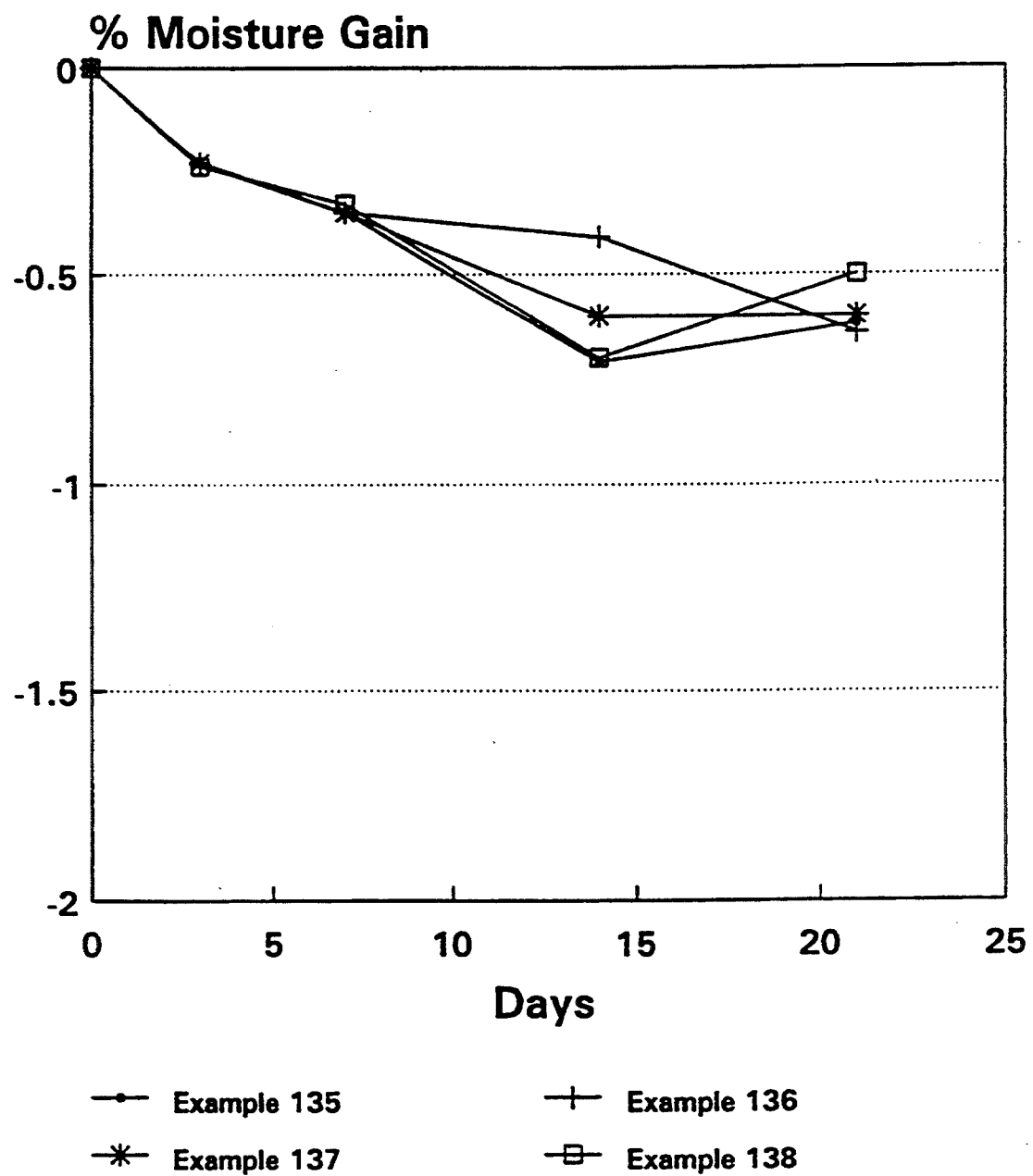
FIG. 4 shows test results of moisture loss at low RH for gum containing FOS.
Figure 5:
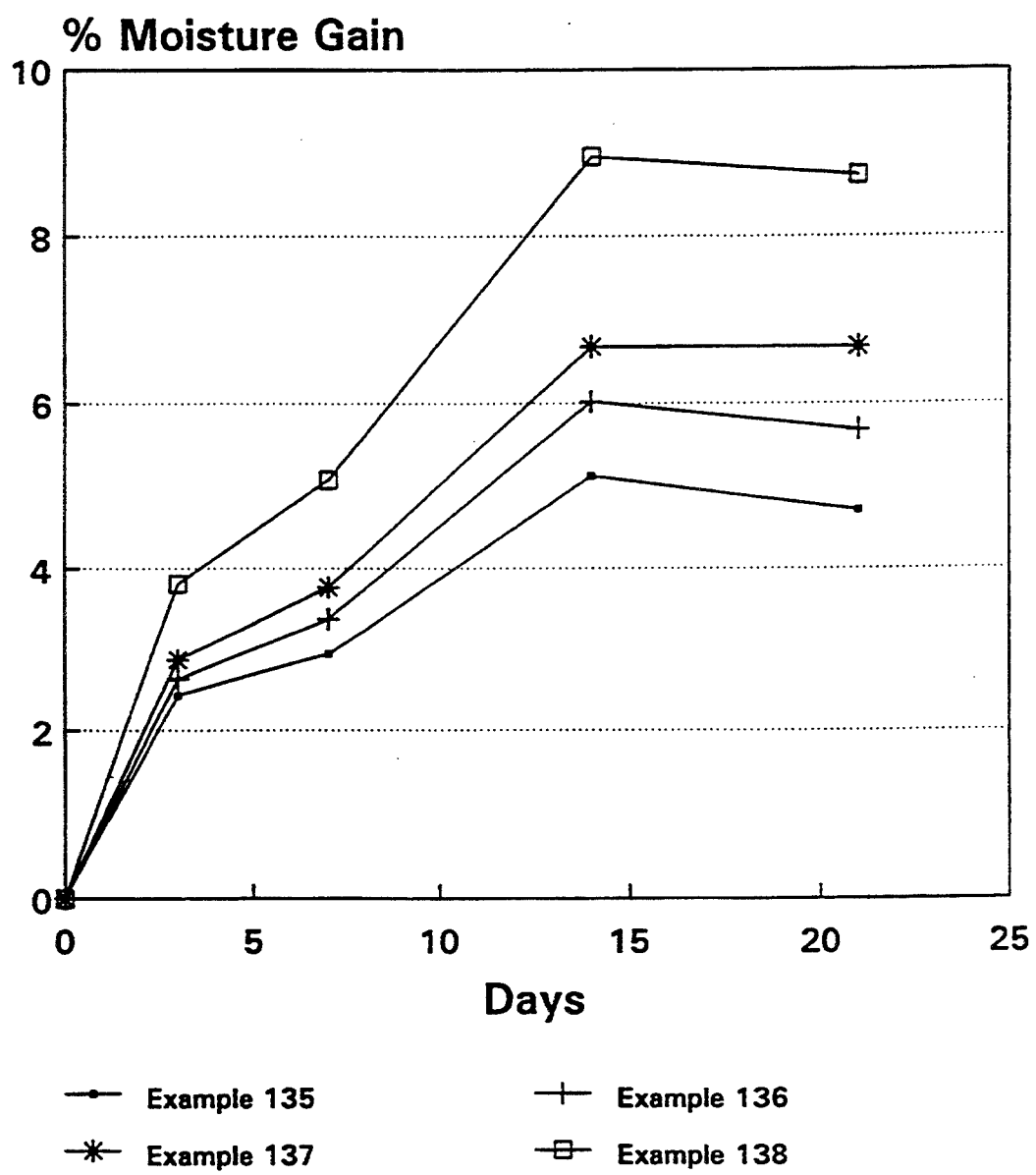
FIG. 5 shows test results of moisture gain at high RH for gum containing FOS.

The gum formulations were formed and cut into 3.2 gm sticks and weighed, then placed in small aluminum dishes and stored at 74° F. and either 20% R.H. or 75% R.H. for accelerated aging studies. Gum samples were reweighed after 0, 3, 7, 14, and 21 days to determine the effect of FOS. Results are shown in FIGS. 4 and 5.

These results indicate that moisture loss is about the same at various levels at low R.H., but moisture gain increases with high R.H., which demonstrates the effectiveness of FOS as a humectant in sugar gum formulations, thus improving shelf life of chewing gum formulations.

EXAMPLES 139–142

The following gum formulations were prepared using NutraFlora Syrup (FOS) at 75% solids:

|  | EX. 139 | EX. 140 | EX. 141 | EX. 142 |
|---|---|---|---|---|
| BASE | 20.2 | 20.2 | 20.2 | 20.2 |
| 45.5 Be SYRUP | 13.3 | 13.3 | 6.7 | — |
| GLYCERIN | 1.3 | — | 1.3 | 1.3 |
| SUGAR | 54.4 | 54.4 | 54.4 | 54.4 |
| DEXTROSE MONOHYDRATE | 9.9 | 9.9 | 9.9 | 9.9 |
| PEPPERMINT FLAVOR | 0.9 | 0.9 | 0.9 | 0.9 |
| FOS SYRUP | — | 1.3 | 6.6 | 13.3 |

Figure 6:
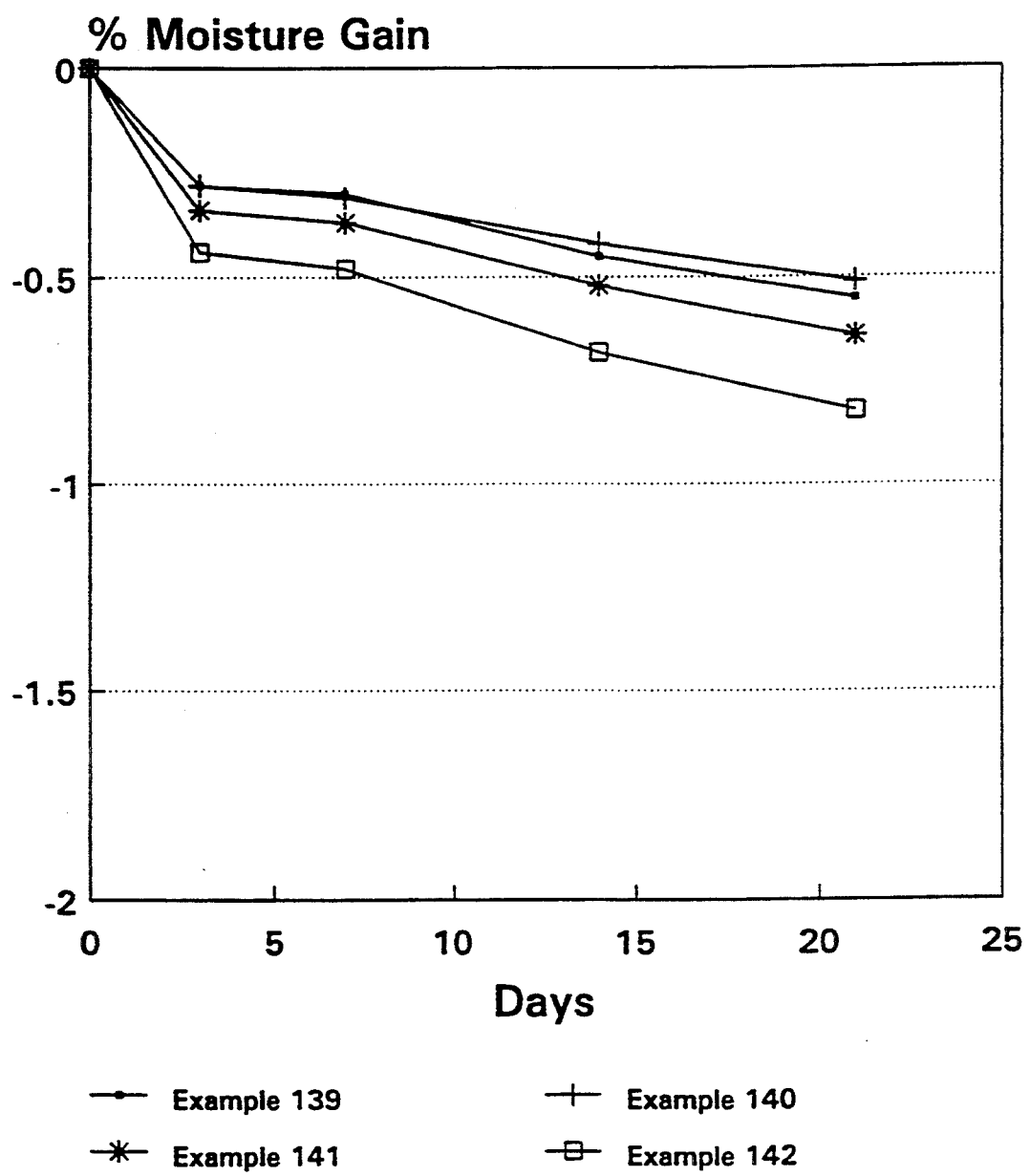
FIG. 6 shows test results of moisture loss at low RH for gum with liquid FOS.
Figure 7:
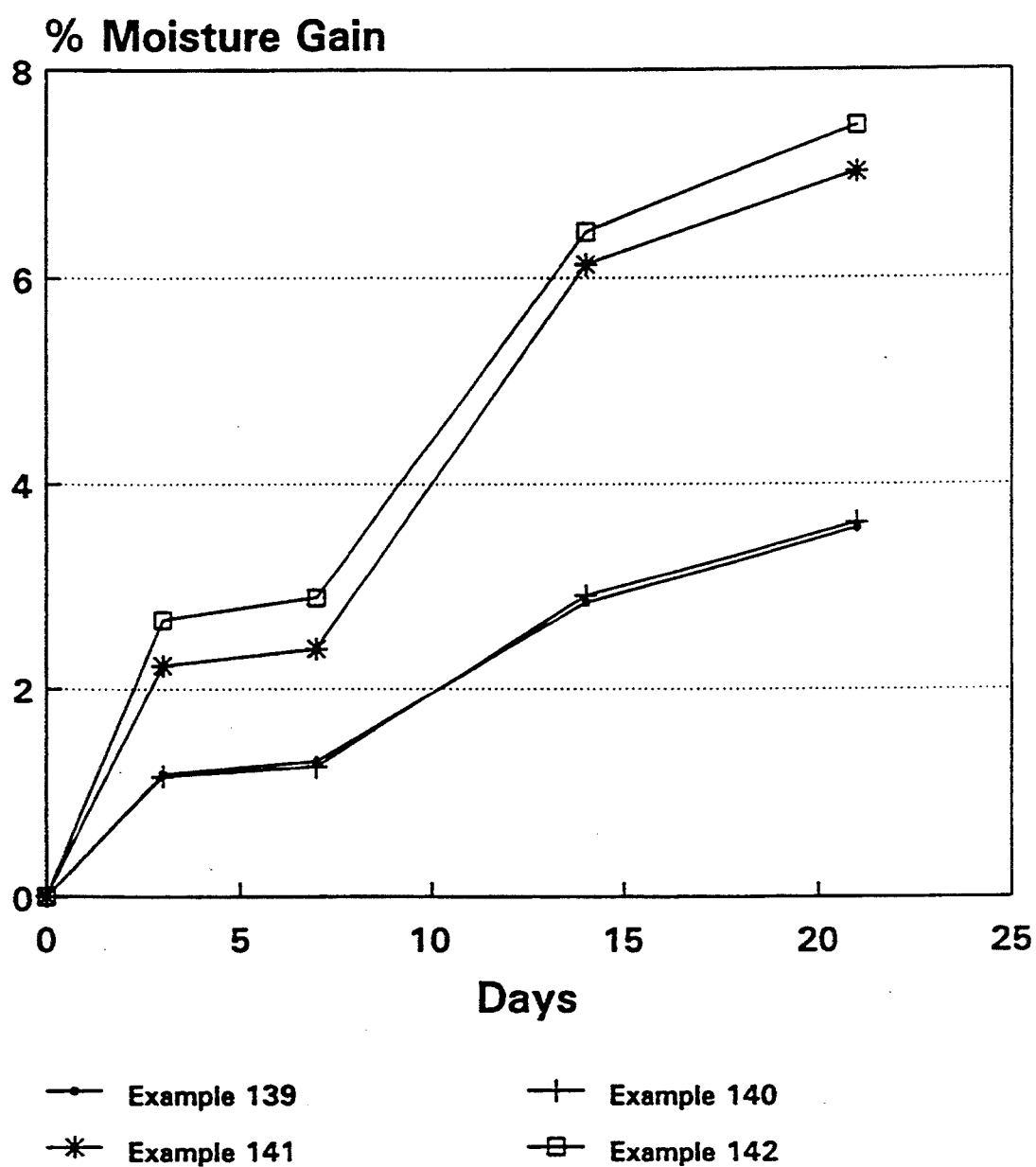
FIG. 7 shows test results of moisture gain at high RH for gum with liquid FOS.

The gum formulations were formed and cut into 3.2 gm sticks and weighed, then placed in small aluminum dishes and stored at 74° F. and either 20% R.H. or 75% R.H. for accelerated aging studies. Gum samples were reweighed after 0, 3, 7, 14, and 21 days and results are shown in FIGS. 6 and 7.

Comparing Examples 139 and 140, FOS syrup is equally effective as glycerin for use as a humectant. Gum with higher levels of liquid FOS losses more moisture since it adds moisture to the gum at low R.H. At higher R.H. it picks up more moisture. In both cases, liquid FOS keeps gum more flexible and softer during its shelf life.

EXAMPLES 143–149

The following examples show how FOS may be added to gum to make a non-sugar gum formulation with other bulking agents.

|  | EX. 143 | EX. 144 | EX. 145 | EX. 146 | EX. 147 | EX. 148 | EX. 149 |
|---|---|---|---|---|---|---|---|
| BASE | 30.3 | 30.3 | 28.4 | 27.0 | 27.0 | 27.0 | 24.6 |
| TALC | 8.1 | 8.1 | — | — | — | — | — |
| LECITHIN | 0.5 | 0.5 | — | — | — | — | 0.2 |
| GLYCERIN | 10.0 | 10.0 | 6.0 | 8.1 | 8.1 | 8.1 | 17.0 |
| APM | 0.5 | 0.5 | 0.5 | 0.5 | 0.5 | 0.5 | 0.5 |
| COLOR | 0.03 | 0.03 | 0.03 | 0.13 | 0.13 | 0.13 | — |
| SPEARMINT FLAVOR | 1.67 | 1.67 | 1.67 | 1.67 | 1.67 | 1.67 | — |
| INDIGESTIBLE DEXTRIN (FIBERSOL) | 46.2 | 43.7 | — | — | — | — | — |
| FOS POWDER | 2.5 | 5.0 | 31.7 | 37.3 | 43.6 | 50.0 | 56.2 |
| MENTHOL | 0.2 | 0.2 | — | — | — | — | — |
| PALATINOSE | — | — | 31.7 | 25.3 | 19.0 | 12.6 | — |
| PEPPERMINT FLAVOR | — | — | — | — | — | — | 1.5 |

All of the above gum formulations that were mixed on a lab scale for screening tests on non-sugar gums gave quality gum formulations.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

We claim:

1. A chewing gum composition comprising sweetness imparting amounts of unencapsulated aspartame and an effective amount of fructooligosaccharides to stabilize said aspartame against decomposition during storage at 85° F. for eight weeks whereby at least 5% less aspartame decomposes into non-sweetening derivatives than would have decomposed if the fructooligosaccharides were not included in the gum composition.

2. The chewing gum composition of claim 1 wherein the gum composition comprises at least 10% fructooligosaccharides.

3. The chewing gum composition of claim 1 wherein the gum composition comprises about 0.005% to about 1% unencapsulated aspartame.

4. The chewing gum composition of claim 1 wherein the fructooligosaccharides are effective such that after eight weeks of storage at 85° F., over 80% of the unencapsulated aspartame originally formulated in the gum composition remains undecomposed.

5. A chewing gum composition comprising a high-intensity sweetener encapsulated with fructooligosaccharides.

6. A chewing gum composition comprising a flavor encapsulated with fructooligosaccharides.

7. The chewing gum composition of claim 1 wherein the fructooligosaccharides are in the form selected from the group consisting of powder, syrup and mixtures thereof.

8. A chewing gum product having a rolling compound thereon, the rolling compound comprising fructooligosaccharides.

9. The chewing gum product of claim 8 wherein the fructooligosaccharides comprise from about 0.5% to 100% of the rolling compound.

10. The chewing gum product of claim 8 wherein the fructooligosaccharides comprise from about 0.005% to about 5% of the chewing gum product.

11. A coated chewing gum product comprising a gum pellet coated with a coating comprising fructooligosaccharides.

12. The coated chewing gum product of claim 11 wherein the fructooligosaccharides comprise about 0.1% to about 20% of the coating.

13. The coated chewing gum product of claim 11 wherein the coating comprises a hard shell coating.

14. A chewing gum product having a liquid center wherein the liquid center comprises fructooligosaccharides.

15. The chewing gum product of claim 8 wherein the fructooligosaccharides are in the form selected from the group consisting of powder, syrup and mixtures thereof.

16. A method of making a coated chewing gum product comprising the steps of:
   a) providing a gum pellet;
   b) applying a liquid coating syrup to the surface of the gum pellet, the coating syrup comprising fructooligosaccharides, and
   c) solidifying the coating syrup.

17. The method of claim 16 wherein the coating syrup comprises a solution and the step of solidifying the coating comprises drying the solution.

18. The method of claim 16 wherein the coating syrup is applied in successive layers, with each layer of syrup being dried before application of an additional layer.

19. The method of claim 18 wherein a powdered coating is applied after one or more of the syrup layers is applied.

20. The method of claim 19 wherein the powdered coating comprises fructooligosaccharides, maltodextrin, gelatin, cellulose derivative, starch, modified starch, vegetable gum, filler or mixtures thereof.

21. A method of making chewing gum comprising the steps of:
   a) co-drying a solution containing fructooligosaccharides and another sweetener selected from the group consisting of sugar sweeteners, alditol sweeteners and high-potency sweeteners, and
   b) mixing the co-dried, fructooligosaccharides sweetener with gum base and flavoring agents to produce a gum composition.

22. A method of making chewing gum comprising the steps of:
   a) co-evaporating an aqueous solution comprising fructooligosaccharides and a plasticizing agent to form a syrup, and
   b) mixing the syrup with gum base, bulking agents and flavoring agents to produce a gum composition.

23. The method of claim 16 wherein the fructooligosaccharides are in the form selected from the group consisting of powder, syrup and mixtures thereof.

24. The chewing gum composition of claim 1 wherein the fructooligosaccharides is in the form of an aqueous syrup.

25. The method of claim 16 wherein the product is non-cariogenic.

26. The method of claim 16 wherein the product is free of polyols.

27. The method of claim 22 wherein the plasticizing agent is selected from the group consisting of glycerin, propylene glycol and mixtures thereof.

28. A chewing gum composition comprising:
   a) about 5% to about 95% gum base;
   b) about 0.1% to about 10% of a flavoring agent,
   c) about 5% to about 90% bulking agent, the bulking agent comprising at least in part fructooligosaccharides, and
   d) sweetening amounts of aspartame.

29. The chewing gum composition of claim 5 wherein the fructooligosaccharides are in the form selected from the group consisting of powder, syrup and mixtures thereof.

30. The chewing gum composition of claim 6 wherein the fructooligosaccharides are in the form selected from the group consisting of powder, syrup and mixtures thereof.

31. The coated chewing gum product of claim 11 wherein the fructooligosaccharides are in the form selected from the group consisting of powder, syrup and mixtures thereof.

32. The chewing gum product of claim 14 wherein the fructooligosaccharides are in the form selected from the group consisting of powder, syrup and mixtures thereof.

33. The method of claim 21 wherein the fructooligosaccharides are in the form selected from the group consisting of powder, syrup and mixtures thereof.

34. The method of claim 22 wherein the fructooligosaccharides are in the form selected from the group consisting of powder, syrup and mixtures thereof.

* * * * *

UNITED STATES PATENT AND TRADEMARK OFFICE
CERTIFICATE OF CORRECTION

PATENT NO. : 5,425,961
DATED : June 20, 1995
INVENTOR(S) : Yatka et al.

It is certified that error appears in the above-identified patent and that said Letters Patent is hereby corrected as shown below:

In column 2, line 42, please replace "another sweeteners" with --another sweetener--.

Signed and Sealed this

Twenty-seventh Day of June, 2000

Attest:

Q. TODD DICKINSON

*Attesting Officer*  *Director of Patents and Trademarks*